United States Patent [19]

Cabaret et al.

[11] Patent Number: 4,984,246
[45] Date of Patent: Jan. 8, 1991

[54] SLAB LASER WITH OPTICAL PUMPING FROM A SOURCE HAVING A NARROW EMITTING AREA

[75] Inventors: Louis Cabaret, Dourdan; Geneviéve Girard, Jouy En Josas; Pierre Pinson, Briis Sous Forges; Thibaut De Saxce, Palaiseau, all of France

[73] Assignee: Societe Anonyme dite : Laserdot, Paris, France

[21] Appl. No.: 460,494

[22] Filed: Jan. 3, 1990

[30] Foreign Application Priority Data

Jan. 3, 1989 [FR] France ................. 89 00029

[51] Int. Cl.[5] .................................. H01S 3/09
[52] U.S. Cl. ........................ 372/69; 372/35; 372/93; 372/75
[58] Field of Search ............ 372/69, 72, 92, 93; 373/35, 75

[56] References Cited

U.S. PATENT DOCUMENTS 4,710,940 12/1987 Sipes, Jr. ................. 372/69
4,894,839 1/1990 Baer ........................ 372/93
4,916,712 4/1990 Bender ..................... 372/93

OTHER PUBLICATIONS

Nachrichten Elektronik, vol. 32, No. 1, Jan. 1978, pp. 5–9, Heidelberg, Germany, W. W. Krühler: "Eigenschaften von Neodym-Ebsern für die Optische Nachrichtentechnik".
Optics Letters, vol. 13, No. 3, Mar. 1988, pp. 204–206, Optical Society of America, New York, U.S.; M. K. Reed et al., "Diode-Laser-Array-Pumped Neodym Slab Oscillators".

*Primary Examiner*—Léon Scott, Jr.
*Attorney, Agent, or Firm*—Sughrue, Mion, Zinn, Macpeak & Seas

[57] ABSTRACT

An Nd/YAG slab laser (1) is pumped by laser diodes (2) placed at a distance from the laser slab. Reflectors (7) convey the light from the diodes to the slab. The distance is such that the density of such light is made uniform. A cooling fluid flows along a compartment (5) between the diodes and the slab. The invention is applicable to producing infrared coherent light.

9 Claims, 2 Drawing Sheets

SLAB LASER WITH OPTICAL PUMPING FROM A SOURCE HAVING A NARROW EMITTING AREA

The present invention relates to making an optically pumped laser whose active medium is in the form of a slab. In order to provide pumping light sources for such a laser, one known technique consists in using laser diodes. Such a diode is constituted by a semiconductor plate and it emits light from a narrow emitting area whose dimensions may be 0.001 mm by 10 mm for example. The pumping beam formed then has a divergent angle lying in the range about 20° to about 90°.

BACKGROUND OF THE INVENTION

A prior art laser using such pumping sources includes certain essential items in common, at least with respect to their functions mentioned below, with a laser of the present invention.

These essential items in common are the following:
a laser slab having two main faces each having two edges which extend along a longitudinal direction and which are separated in a transverse direction by the width of said slab, said slab also having thickness in a pumping direction and sections in the transverse direction and the pumping direction, the material of said slab being suitable for being excited by pumping light arriving along said pumping direction in order to amplify light to be amplified and propagating along said longitudinal direction;

at least one pumping source facing at least one of said main faces in order to deliver said pumping light distributed over said longitudinal direction, each of said sources emitting said light via an emitting area which is narrow relative to said plate, at least in said transverse direction; and a reflector system suitable for reflecting said pumping light so as to avoid losses.

One such prior art laser is described in the article: "Diode-laser-array-pumped neodymium slab oscillators," by M. K. Reed, W. J. Kozlovsky, R. L. Byer, G. L. Harnagle, and P. S. Cross, published in Optics Letters, Vol. 13, No. 3, March 1988.

The reflector of this laser is constituted by a simple mirror disposed facing one of the main faces of the plate, namely the face opposite to the face which is illuminated by the pumping sources. It serves to increase the overall energy efficiency of the laser by reducing losses of pumping light to the outside of the laser.

Nevertheless, it remains desirable to increase the efficiency of such a a laser further, and/or to increase the light power which it is capable of delivering.

Particular aims of the present invention include increasing the uniformness of pumping while avoiding losses of pumping light to the outside of such a laser, and while enabling the slab to be cooled.

SUMMARY OF THE INVENTION

A laser of the invention includes the essential items in common as mentioned above, and it presents at least some of the following preferred dispositions:

said emitting area of each of said pumping sources is disposed in an emission strip extending longitudinally facing one of said main faces at a distance from said face constituting a pumping distance d, said emission strip having two longitudinal edges, said reflector system including, for each of said emission strips, two reflectors which extend longitudinally and which interconnect, along said pumping direction, the two said edges of said emission strip with respective ones of the two said edges of the same main face facing said strip, thereby forming a light duct conveying said pumping light from said emission strip to said main face over said pumping distance, said pumping distance being selected to be sufficiently great to ensure that said pumping light is substantially uniform over the width of said main face, which disposition makes it possible to obtain good uniformness of pumping while simultaneously minimizing losses of pumping light;

the laser further includes a cooling circuit for causing a cooling liquid to flow through said light duct, preferably along said longitudinal direction, this disposition makes it possible to obtain effective cooling of the bar in simple manner; and the said pumping distance lies in the range 50% to 200% of an overlap distance which is such that, should such a pumping source be situated facing such a main face at said distance from said face, then the non-guided divergent beam emitted by said source would illuminate the width of said face and only said width, more precisely the pumping distance is of the same order of magnitude as the overlap distance.

BRIEF DESCRIPTION OF THE DRAWINGS

An implementation of the present invention within the outlines given above is described in greater detail below by way of non-limiting example and with reference to the accompanying diagrammatic figures. When the same item appears in several figures it is designated in all of them by the same reference symbol. The implementation given by way of example includes the preferred dispositions mentioned above. It should be understood that the items mentioned may be replaced by other items that perform the same technical functions.

DETAILED DESCRIPTION

Figure 1:
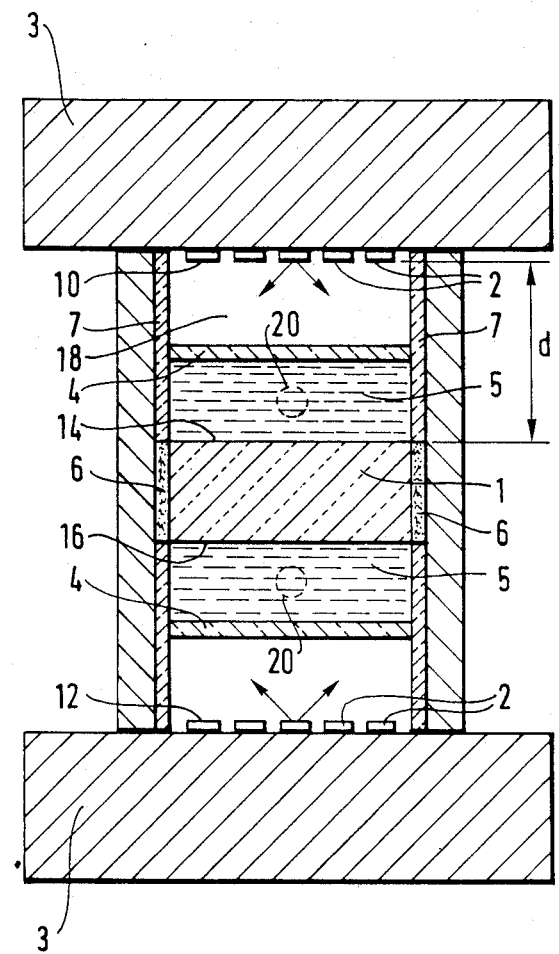
FIG. 1 is a vertical cross-section view through a laser of the invention with the pumping direction being shown vertically in the figure.
Figure 2:
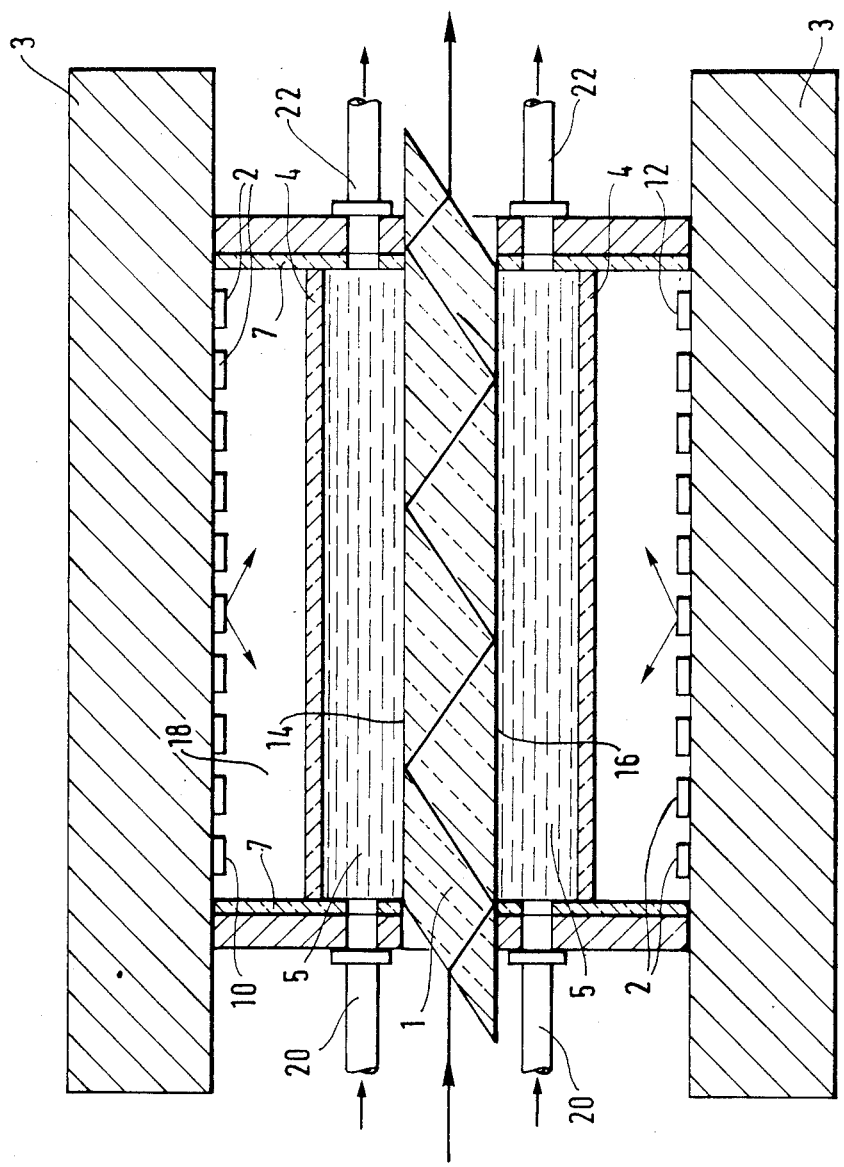
FIG. 2 is a section through the same laser on a longitudinal vertical plane.

In the laser given by way of example, the pumping sources are conventional laser diodes 2 and the pumping distance is referenced d. It is several millimeters. However, these sources could be different in nature and their emitting areas could be constituted, in particular by the ends of optical fibers conveying pumping light produced at a distance from the reflector.

The emitting areas of the diodes are distributed longitudinally and transversely in two of said transmitting strips 10 and 12 facing respective ones of the two said main faces 14 and 16 of the laser slab, with the laser being symmetrical about the planes of symmetry of the slab 1. On each side of the slab, the diodes are cooled by a metal heat sink such as 3 provided with a cooling circuit (not shown).

The two side faces of the laser plate 1 are covered with a thermally insulating layer such as 6.

Two reflectors such as 7 extend from the two edges of each of the two main faces such as 14 to the two edges of the facing emission strip such as 10.

The said cooling circuit 20, 5, 22 comprises a window 4 which is transparent to said pumping light and which extends along said longitudinal and transverse directions between said emission strip 10 and said main face 14 facing said strip. It constitutes a cooling compartment 5 in said light duct 5, 18, the compartment being in thermal contact at least with said main face and at a distance from said emission strip.

The window receives antireflection treatment for the pumping light. Like the compartment, the window extends transversely from one of the reflectors such as 7 to the other.

The light duct also includes another compartment 18 between the window and the emission strip 10.

In addition to the compartment 5, the cooling circuit includes water inlet and outlet pipes such as 20 and 22, together with external components (not shown).

It should be observed, that when the emitting areas are constituted by the end faces of optical fibers, these areas may be immersed in the cooling water, in which case there is no need to provide windows such as 4.

In this case, the gaps between the light emitting areas of the fibers should advantageously be treated to reflect pumping light.

The laser described above has the following characteristics and advantages:

The laser diodes are far enough away from the laser slab for planes of equal excitation to h=parallel to the main faces thereof. This ensures that no part is "over excited" which would give rise to non-uniformness in the laser beam. A computer program simulating the dumping of energy into the slab shows up this effect well, and makes it possible in each particular case to calculate the minimum distance between the laser diodes and the slab.

The reflectors 7 serve to direct towards the slab those rays emitted by the laser diode which would otherwise not reach it given the distance away of the diodes.

This distance also makes it possible to insert two windows having antireflection treatment at the emission wavelength of the laser diodes and to allow a cooling liquid to flow, whereas this is not possible when the laser diodes are placed in the immediate vicinity of the slab. As a result the laser may operate at a high average power.

By way of numerical example, mention may be made of an Nd:YAG laser operating continuously at a power of 100 watts:

slab made of $Nd^{3+}$:YAG;

slab dimensions: 5 mm × 9 mm × 80 mm (volume 3.5 $cm^3$); and total pumping light power: 400 W, produced by 40 laser diodes each delivering 10 W. Five series of 4 laser diodes each are placed on each side of the slab.

These sets of 20 laser diodes may be integrated in the form of a two-dimensional one-piece laser diode semiconductor block.

The central emission wavelength of the laser diodes is 807 nm.

The electrical power fed to the laser diodes equals 1 kW.

What is claimed is:

1. A slab laser with optical pumping from a source having a narrow emitting area, a laser comprising:
   a laser slab having two main faces each having two edges which extend along a longitudinal direction and which are separated in a transverse direction by the width of said slab, said slab also having thickness in a pumping direction and sections in a transverse direction and the pumping direction, material of said slab being excited by pumping light arriving along said pumping direction to amplify light propagating along said longitudinal direction;
   at least one pumping source facing at least one of said main faces of said laser slab to deliver said pumping light distributed over said longitudinal direction, each of said sources emitting said light via an emitting area which is narrow relative to a laser plate, at least in said transverse direction; and
   a reflector system suitable for reflecting said pumping light to avoid cavity losses;
   wherein said emitting area of each of said pumping sources is disposed in an emission strip extending longitudinally, and facing one of said main faces at a distance from said face constituting a pumping distance d, said emission strip having two longitudinal edges; and
   said reflector system includes, for each of said emission strips, two reflectors which extend longitudinally and which interconnect, along said pumping direction, the two said edges of said emission strip with respective ones of the two said edges of a same main face facing said strip, thereby forming a light duct conveying said pumping light from said emission strip to said main face over said pumping distance, said pumping distance selected to be sufficiently great to ensure that said pumping light is substantially uniform over the width of said main face.

2. A laser according to claim 1, further including a cooling circuit for causing a cooling liquid to flow through said light duct.

3. A laser according to claim 2, wherein said cooling circuit causes a cooling fluid to flow along said longitudinal direction.

4. A laser according to claim 2, wherein said cooling circuit includes a window transparent to said pumping light and extending along said longitudinal direction and said transverse direction between said emission strip and said main face facing said strip, thereby forming a cooling compartment in said light duct, said compartment being in thermal contact at least with said main face and at a distance from said emission strip.

5. A laser according to claim 1, wherein said pumping distance d is not less than 50% of an overlap distance which is such that one of said pumping sources facing one of said main faces at said distance from said face, causes a divergent and non-guided beam emitted by said source to illuminate the width of said face and only said width.

6. A laser according to claim 5, wherein said pumping distance d is not greater than twice said overlap distance.

7. A laser according to claim 1, including two of said emission strips facing respective ones of said two main faces of the laser plate.

8. A laser according to claim 7, wherein each of said emission strips contains the emitting areas of a plurality of said pumping sources distributed along said longitudinal and/or transverse directions.

9. A laser according to claim 1, in which said pumping sources are laser diodes.

* * * * *